US 7,000,109 B2

(12) United States Patent  (10) Patent No.: US 7,000,109 B2
Girard  (45) Date of Patent: Feb. 14, 2006

(54) METHOD AND APPARATUS FOR UNLOCKING A COMPUTER SYSTEM HARD DRIVE

(75) Inventor: Luke E. Girard, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 818 days.

(21) Appl. No.: 10/002,541

(22) Filed: Nov. 21, 2001

(65) Prior Publication Data

US 2003/0097585 A1     May 22, 2003

(51) Int. Cl.
*G06F 1/24* (2006.01)
(52) U.S. Cl. ............... 713/168; 713/172; 713/182; 713/184; 713/185; 713/186; 713/193; 713/200; 713/201
(58) Field of Classification Search ................ 713/168, 713/172, 182, 184, 185, 186, 193, 200, 201
See application file for complete search history.

(56) References Cited

U.S. PATENT DOCUMENTS

| 5,212,729 | A | 5/1993 | Schafer |
| 5,375,243 | A | 12/1994 | Parzych et al. |
| 5,884,026 | A | 3/1999 | Kong |
| 6,012,145 | A | 1/2000 | Mathers et al. |
| 6,012,146 | A | 1/2000 | Liebenow |
| 6,189,100 | B1 * | 2/2001 | Barr et al. ................... 713/182 |
| 6,209,099 | B1 * | 3/2001 | Saunders .................... 713/200 |
| 6,263,431 | B1 * | 7/2001 | Lovelace et al. ............... 713/2 |
| 6,272,631 | B1 * | 8/2001 | Thomlinson et al. ........ 713/155 |

FOREIGN PATENT DOCUMENTS

| EP | 0 770 997 A2 | 5/1997 |
| GB | 2 340 630 A | 2/2000 |
| WO | WO 01/60013 A1 | 8/2001 |

OTHER PUBLICATIONS

IBM Technical Disclosure Bulletin, "Hard Disk Drive Data Security Protection Method", IBM, Corp. New York, vol. 38, No. 5, May 1, 1995, p. 73, XP00051901.
IBM Technical Disclosure Bulletin, "Hard Disk Drive Access Password Support For Power Management", IBM, Corp. New York, vol. 37, No. 11, Nov. 1, 1994, p. 639, XP000487362.

* cited by examiner

*Primary Examiner*—Thomas R. Peeso
(74) *Attorney, Agent, or Firm*—Blakely, Sokoloff, Taylor & Zafman LLP

(57) ABSTRACT

For one embodiment of the present invention, a protected storage device of a computer system includes a password stored therein. Instructions may be included on the computer system to authenticate the user. Once authenticated, the password may be transferred to a hard drive where it may be used to unlock the drive. Subsequent to unlocking the drive, an operating system may be loaded. For one embodiment of the present invention, the drive may be relocked by reducing the voltage supplied to the drive in accordance with a power management policy. The drive may be again unlocked by re-authenticating the user and transferring the password from protected storage to the drive.

12 Claims, 2 Drawing Sheets

METHOD AND APPARATUS FOR UNLOCKING A COMPUTER SYSTEM HARD DRIVE

The present invention relates to computer systems and more particularly to a secure method for unlocking a hard drive using a security policy defined by a system manufacturer or end user.

BACKGROUND

Computer systems are becoming increasingly pervasive in our society, including everything from small handheld electronic devices, such as personal data assistants and cellular phones, to application-specific electronic components, such as set-top boxes and other consumer electronics, to medium-sized mobile and desktop systems to large workstations and servers. As computers become ubiquitous, computer security issues have become more important. Ways of deterring theft of computers are evolving to meet the challenges posed by the portable nature of many computers. Various methods of user authentication may be used to provide security and to deter theft. These methods include passwords.

In some computer systems, upon turning on the computer, the computer may request the user for authentication by way of a password. Once the user types in the password, the password may be passed to the hard drive of the computer system. After being received by the drive, the password is used to unlock the drive. Once unlocked, the operating system (OS) stored in the drive is loaded into the memory subsystem of the computer and the boot process proceeds.

There are many problems with this type of authentication process, and the present invention is intended to addresses some of these problems.

BRIEF DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, a computer system includes not only a BIOS but also a separate protected storage device. A password is securely stored in the protected storage device. The BIOS may include Instructions to authenticate the user after the computer is turned on but before the OS is loaded. These authentication instructions may direct the computer system to authenticate the user by any one or more of a number of ways including, for example, password, fingerprint, and token possession verification. The authentication method used may be more or less secure than simply entering the hard drive password into the computer system by the user.

Once authenticated, the password stored in the protected storage device may be transferred to the hard drive of the computer system where it may be used to unlock the drive. Subsequent to unlocking the drive, the operating system stored on the drive may be loaded and the boot process may proceed.

After the boot process is completed, and the computer system is under OS control, a power manager may send a signal that causes the voltage supplied to the hard drive to be reduced to limit power consumption by the drive. This may have the effect of relocking the drive such that the drive remains locked even after the voltage supply is again increased to an operational level. The voltage supply may be increased in response to a wake event, and this wake event may include, for example, an access request by a remote user of the computer system such as a system administrator. The drive may again be unlocked by transferring the password from the protected storage device to the drive. This transfer may take place automatically after the wake event or in response to re-authenticating the user after the wake event. The authentication method used may be more or less secure than simply entering the hard drive password into the computer system by the user.

A more detailed description of embodiments of the present invention, including various configurations and implementations, is provided below.

Figure 1:
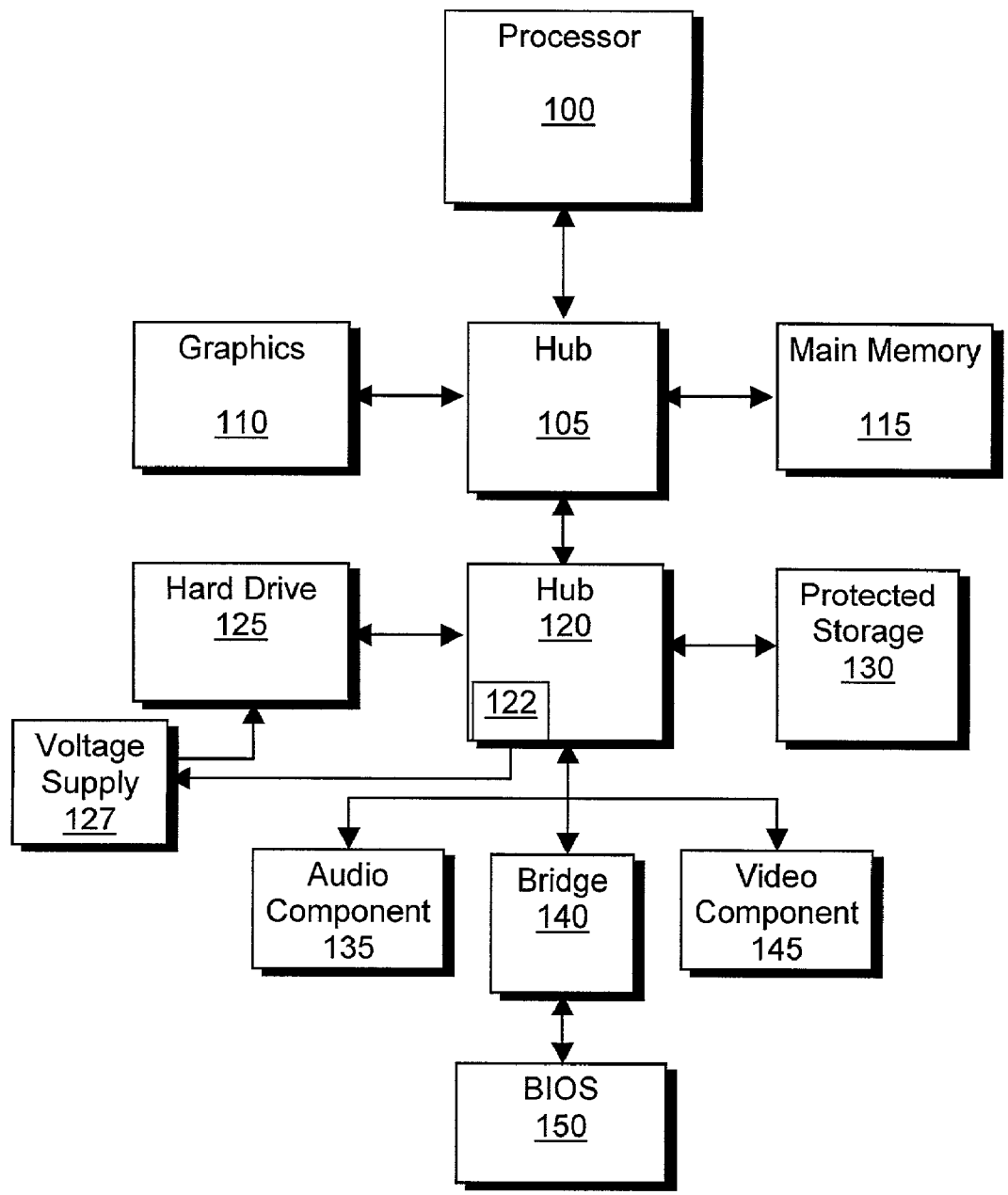
FIG. 1 includes a computer system formed in accordance with an embodiment of the present invention.

FIG. 1 includes a computer system formed in accordance with an embodiment of the present invention. Processor 100 may be coupled to graphics controller 110, main memory 115, and hub 120 via hub 105. Hub 120 couples hard drive 125 to protected storage 130. In addition, power manager 122 may reside within hub 120 and may be coupled to voltage supply 127. Voltage supply 127 supplies a voltage to hard drive 125. Audio component 135, such as an audio input/output device, video component 145, such as a video input/output device, and bridge 140 may be coupled to one or more buses of hub 120. BIOS 150 may be coupled to bridge 140. In accordance with an alternate embodiment of the present invention, the BIOS may be contained in or coupled to an alternate device such as Hub 120 or any other device of FIG. 1. In addition, protected storage may be contained in or coupled to an alternate device such as bridge 140 or any other device of FIG. 1.

In accordance with one embodiment of the present invention, hard drive 125 of FIG. 1 includes password protection circuitry that locks the drive when power is removed (or reduced below an operational threshold level) and is subsequently reapplied to the drive. Locking the hard drive prevents or impedes access to the contents of the drive by the average user. For one embodiment of the present invention, hard drive 125 is an ATA-3 drive. For an alternate embodiment of the present invention, hard drive 125 may be any type of storage medium having password protection or any other form of protection that may be applied before the operating system has been loaded.

In accordance with one embodiment of the present invention, hub 120 of FIG. 1, which may alternatively be referred to as a bridge or south bridge, may include power manager 122. For an alternate embodiment of the present invention, this power manager may be contained in a discrete component or may be integrated into another device, such as hub 105 or bridge 140. In any event, power manager 122 of the computer system of FIG. 1 may be coupled to voltage supply 127 to adjust the voltage level to hard drive 125.

In accordance with one embodiment of the present invention, protected storage device 130 contains the password to unlock hard drive 125 of FIG. 1. This password is securely stored within protected storage device 130 such that it can only be accessed by authorized users or applications. In accordance with one embodiment of the present invention, the level of protection provided by protected storage 130 is determined by the underlying protected storage technology. The underlying storage technology may determine the protection mechanism, protocol, and other security requirements which may be known beforehand by both pre-OS and OS-present applications or, in another embodiment, negotiated during a handshake process. In one embodiment, the negotiations may occur during installation or set up of a particular application program.

For one embodiment of the present invention, protected storage 1330 of FIG. 1 is permanent to the computer system and may not be easily removed. For example, protected storage device 130 may be a discrete component that is soldered to a printed circuit board, such as a motherboard, of the computer system. For this or another embodiment, protected storage device 130 may be contained within another component of the system, such as hub 120. In accordance with an embodiment of the present invention, protected storage device 130 may be part of the chipset of the computer system. Alternatively, protected storage 130 may be contained on a removable smart card. For this embodiment of the present invention, the smart card may act as a security token (to be described in more detail below) for user authentication in addition to providing protected storage for the hard drive password. For this embodiment, a security protocol may be implemented to authenticate the smart card to the computer system. For another embodiment, the security token may be bound to one or more platforms such that the token may only be used on associated platforms.

In accordance with one embodiment of the present invention, the computer system of FIG. 1 includes BIOS 150 that is separate from protected storage 130. Note that the term BIOS, as used herein, may describe not only BIOS software but also the memory storage hardware containing this software. For various reasons, BIOS tends to lack strong protection for data stored therein. For example, BIOS data is typically secured by simple password protection, which may be fairly easily circumvented. Once circumvented, data stored in the BIOS, including, for example, a hard drive password, is readily accessible, thereby jeopardizing the data stored on the hard drive. Protected storage 130 provides a much higher level of protection for the hard drive password than BIOS 150. One reason for this is that stronger security protocols (some of which are described below) may be implemented in conjunction with accessing data stored in protected storage 130. Another reason is that the protected storage may have its own access control engine to act as a gatekeeper to determine who or what has access to its stored information. In accordance with one embodiment of the present invention, protected storage 130 is designed in according to the specifications described for "Non-volatile Protected Storage" in "Intel Protected Access Architecture Application Interface Specification," Rev. 1.0, published March, 2001.

The non-volatile memory components, 125, 130, and 150, of the computer system of FIG. 1, may be any machine-readable medium. For example, any one or more of these memory components may be a magnetic disk (e.g. a hard drive or floppy disk), an optical disk (e.g. a CD or DVD), or a semiconductor device (e.g. Flash, EPROM, or battery-backed RAM). Note that one or more methods of the present invention (described in more detail below) may be implemented by the computer system of FIG. 1 programmed to execute various steps of the method. The instructions of this program may reside, at least in part, in any machine-readable medium of the computer system or in a carrier wave (e.g. an electrical or wireless data signal).

Figure 2:
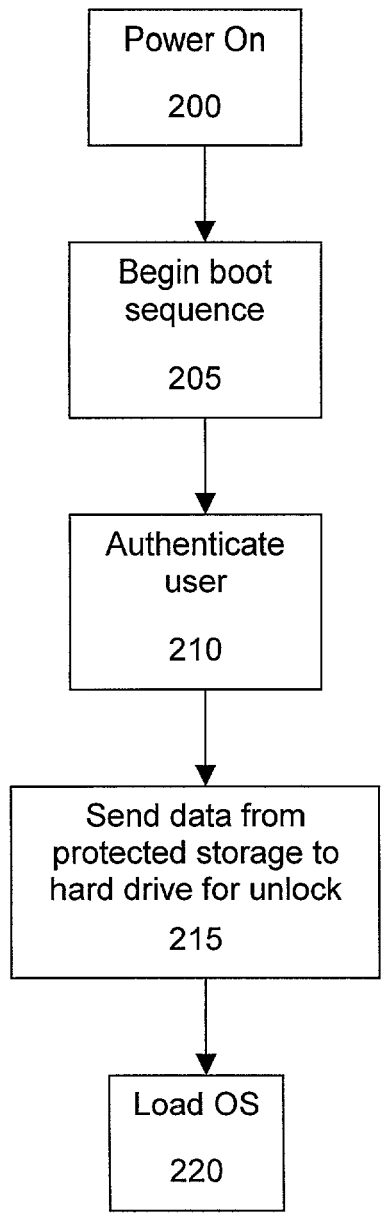
FIG. 2 includes a flow chart showing a method of the present invention.

FIG. 2 includes a flow chart showing a method of the present invention that may be implemented on a computer system such as the computer system of FIG. 1. At step 200, the computer system is powered on and the boot sequence begins at step 205. The BIOS may then be loaded. A set of authentication instructions may be included in the BIOS that direct the computer to authenticate the user. Alternatively, these authentication instructions may reside elsewhere in the computer system and may be called by the BIOS. In accordance with one embodiment of the present invention, at step 210 the computer system may attempt to authenticate the user according to the authentication instructions. Alternatively, for an embodiment in which no authentication is needed or desired, step 210 may be skipped. This embodiment may be found useful for implementation on a computer system that is already relatively secure from theft, such as a stationary home computer system.

In accordance with one embodiment of the present invention, the security protocol (i.e. the authentication process) implemented at step 210 of FIG. 2 is defined by the end user of the computer system. In accordance with an alternate embodiment of the present invention, the security protocol is defined by the computer system manufacturer or distributor.

Authentication of the user at step 210 of FIG. 2 may be implemented in any number of ways, and the level of security offered by the authentication method may be more or less secure than simply entering the hard drive password directly into the computer system by the user. For example, in accordance with one embodiment of the present invention, the authentication instructions may direct the computer system to prompt the user for a password. Note that this password may be determinable beforehand by the user and need not be the same as the hard drive password stored in protected storage 130. This password may then be verified by the computer system by, for example, comparing the password received from the user against a password (separate from the hard drive password) stored in protected storage 130.

For another embodiment, the authentication instructions direct the computer system to verify an inherent trait of the user at step 210 of FIG. 2. For example, in accordance with one embodiment of the present invention, the computer system may prompt the user for a fingerprint, voiceprint, or retinal scan, etc. For an alternate embodiment, the authentication instructions direct the computer to verify something that the user possesses. For example, the computer system may prompt the user to insert a smart card or other security token into a socket. Information associated with the fingerprint, voiceprint, retinal scan, smart card, etc. may then be verified by the computer system by, for example, comparing the information received from the user against data stored in protected storage 130 of FIG. 1.

In accordance with one embodiment of the present invention, the security protocol implemented at step 210 of FIG. 2 is such that multiple authentication methods are used. For example, the user may be authenticated at step 210 by verification of both a fingerprint and a password.

In accordance with one embodiment of the present invention, after the user has been authenticated by the computer system at step 210 of FIG. 2, a hard drive password may be transferred from protected storage 130 to hard drive 125 at step 215 of FIG. 2. For an alternate embodiment of the present invention, other data may be transferred from protected storage 130 to hard drive 125 at step 215 of FIG. 2.

This data may include, for example, an encryption/decryption key, key exchange, or other data associated with a security protocol. This data is collectively referred to herein as "password." In response to receiving the password from protected storage, hard drive 125 may be unlocked at step 215. After being unlocked, the OS stored on hard drive 125 is subsequently permitted to be loaded onto the computer system at step 220, and the boot sequence continues.

Figure 3:
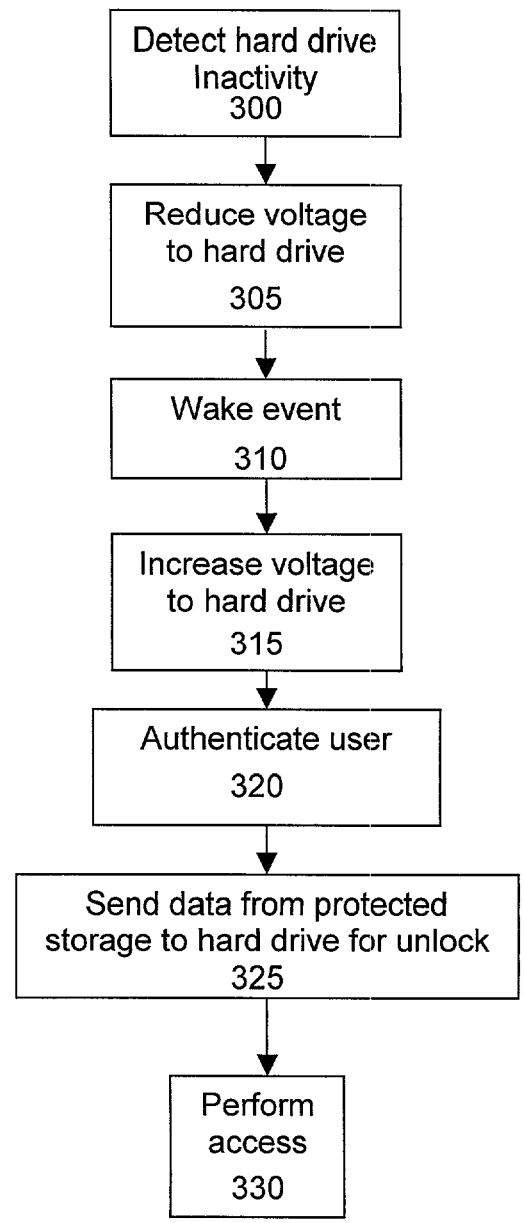
FIG. 3 includes a flow chart showing an alternate method of the present invention.

FIG. 3 includes a flow chart showing an alternate method of the present invention that may be implemented on a computer system such as the computer system of FIG. 1. In accordance with one embodiment of the present invention, the method of FIG. 3 may be implemented on an OS-present computer system, after the system has been booted up and is under OS control.

In accordance with one embodiment of the present invention, at step 300 of FIG. 3, inactivity of the hard drive may be detected. In accordance with one embodiment of the present invention, this detection may be done by the power manager according to a power management policy. For an alternate embodiment, hard drive inactivity may be detected based on user input, such as the user requesting to place the computer in a sleep, suspend, idle, locked, or hibernate mode, etc. In response, voltage supplied to the hard drive may be reduced at step 305. For one embodiment of the present invention, reduction of the voltage may be done in response to the power manager sending a signal to the voltage supply that provides power to the hard drive. For one embodiment, reduction of the voltage supplied to the hard drive may include reducing the voltage level to zero, i.e. turning off power to the hard drive. While this may save power, it may also cause the hard drive to become relocked.

In accordance with one embodiment of the present invention, a wake event occurs at step 310 of FIG. 3. This wake event may be an attempt to access the computer system, or a portion of the computer system, by a user or a software application. The user may be a direct user of the computer system or a remote user such as a system administrator. Similarly, a software application that initiates a wake event may be running directly on the present computer system or it may be running on a separate system coupled to the present computer system.

The voltage supplied to the hard drive may be increased at step 315 in response to receiving the wake event at step 310 of FIG. 3. In accordance with an embodiment of the present invention, after the voltage supplied to the hard drive is raised to an operational level, the hard drive is brought back into service in a locked state.

At step 320 of FIG. 3, the computer system may attempt to authenticate the user. This authentication process may be similar to the authentication process described above in conjunction with step 210 of FIG. 2. Note that the security protocol used to authenticate a user at step 320 of FIG. 3 may be more secure than simply entering the hard drive password into the computer system by the user. This may be particularly advantageous for an embodiment in which the user is a remote system administrator because sending a hard drive password to the computer from a remote location may easily be subject to a security breach.

In accordance with one embodiment of the present invention, after the user has been authenticated by the computer system at step 320 of FIG. 3, the hard drive password may be transferred from protected storage 130 to hard drive 125 at step 325 of FIG. 3. In response to receiving the password from protected storage, hard drive 125 may be unlocked at step 325. After being unlocked, data stored on hard drive 125 may be accessed at step 330.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A computer system comprising:
    a protected storage device including a first password stored therein;
    a hard drive to receive the first password from the protected storage device and, in response, to unlock the drive;
    a voltage supply; and
    a power manager to cause the voltage supply to reduce a voltage to the drive, thereby locking the drive, the power manager to subsequently cause the voltage supply to increase the voltage to the drive, the drive remaining locked until the first password is received.

2. The computer system of claim 1, wherein the protected storage device is soldered to a circuit board of the system.

3. The computer system of claim 1, wherein the protected storage device is part of a chipset of the system.

4. The computer system of claim 1, further comprising a set of instructions to authenticate a user of the computer system and to transfer the first password from the protected storage device to the drive if the user is authenticated.

5. The computer system of claim 4, wherein the user is located remotely from the computer system.

6. The computer system of claim 5, wherein the instructions are to authenticate the user by a method including verifying a second password.

7. A method comprising:
    enabling a user to be authenticated to a computer system using a first method of authentication; and
    enabling the first password to be transferred from a protected storage device to a hard drive of the computer system, if the user is authenticated, to unlock the drive.

8. The method of claim 7, further comprising enabling an operating system stored on the drive to be loaded after the drive is unlocked.

9. The method of claim 7, further comprising enabling a power manager to relock the drive by causing a voltage supplied to the drive to be reduced.

10. A computer system programmed to implement the method of claim 7.

11. A machine-readable medium including machine-readable instructions that, if executed by a machine, cause the machine to perform the method of claim 7.

12. The medium of claim 11, further comprising machine-readable instructions that, if executed by the machine, cause the machine to further load an operating system stored on the drive after the drive is unlocked.

* * * * *